US008275736B2

(12) United States Patent
Guo et al.

(10) Patent No.: US 8,275,736 B2
(45) Date of Patent: Sep. 25, 2012

(54) INCREASING KNOWLEDGE SHARING SUCCESS RATES USING REAL TIME MATCH MAKING

(75) Inventors: Shang Qing Guo, Cortlandt Manor, NY (US); Jonathan Lenchner, North Salem, NY (US); Jennifer Lai, Garrison, NY (US); Jung-Mu Tang, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 12/425,608

(22) Filed: Apr. 17, 2009

(65) Prior Publication Data
US 2010/0268681 A1 Oct. 21, 2010

(51) Int. Cl.
*G06F 17/00* (2006.01)
*G06N 7/04* (2006.01)

(52) U.S. Cl. .......................................................... 706/54
(58) Field of Classification Search ........................ None
See application file for complete search history.

(56) References Cited

U.S. PATENT DOCUMENTS

| 6,901,394 | B2 | 5/2005 | Chauhan et al. | |
|---|---|---|---|---|
| 2001/0032244 | A1* | 10/2001 | Neustel | 709/206 |
| 2003/0004909 | A1 | 1/2003 | Chauhan et al. | |
| 2006/0004601 | A1* | 1/2006 | Marks | 705/1 |

OTHER PUBLICATIONS

A. Ardichvili, V. Page, T. Wentling, "Motivation and barriers to participation in virtual knowledge-sharing communities of practice", Journal of Knowledge Management, vol. 7, No. 1 2003 pp. 64-77.
D. McDonald, M. Ackerman, "Just Talk to Me: A Field Study of Expertise Location", CSCW 98, Seattle Washington, pp. 315-324.
M. Ackerman, D. McDonald, "Answer Garden 2: Merging Organizational Memory with Collaborative Help", Computer Supported Cooperative Work '96, Cambridge MA, pp. 97-105.
N. Ye, F. Zhi-Peng, F. Bo, Motivation Factors That Make Knowledge Workers Share Their Tacit Knowledge in Universities: an Empirical Research, IEEE 2005, pp. 923-927.
K. Ehrlich, C. Lin, V. Griffiths-Fisher, "Searching for Experts in the Enterprise: Combining Text and Social Network Analysis", Group '07, Nov. 4-7, 2007, Sanibel Island, Florida, pp. 117-126.
D. McDonald, M. Ackerman, "Expertise Recommender: A Flexible Recommendation System and Architecture", CSCW '00, Philadelphia, PA, Dec. 2-6, 2000, pp. 10.

(Continued)

*Primary Examiner* — Jeffrey A Gaffin
*Assistant Examiner* — Li-Wu Chang
(74) *Attorney, Agent, or Firm* — Cantor Colburn LLP; Louis Percello

(57) ABSTRACT

A method of knowledge sharing using a computer system is provided. The method includes: receiving a question electronically submitted by a user; forwarding the question and at least one response option to at least one expert using a first computer interface; monitoring selected response options from the at least one expert; and selectively presenting the selected response options to the user using a second computer interface.

20 Claims, 5 Drawing Sheets

OTHER PUBLICATIONS

H. Samieh, K. Wahba, "Knowledge Sharing Behavior From Game Theory and Socio-Psychology Perspectives", Proceedings of the 40th Hawaii International Conference on System Sciences—2007, pp. 10.

I. Alony, G. Whymark, M. Jones, "Sharing Tacit Knowledge: A Case Study in the Australian Film Industry", Informing Science Journal, vol. 10, 2007, pp. 41-59.

C. Dorner, V. Pipek, M. Won, "Supporting Expertise Awareness: Finding Out What Others Know", CHIMIT '07, Mar. 30-31, 2007, Cambridge, MA, pp. 10.

McDonald, David, W., "Evaluating Expertise Recommendations", Published in the Proceedings of the ACM 2001 International Conference on Supporting Group Work (Group '01), Boulder CO, Sep. 30-Oct. 3, 2001, pp. 1-10.

* cited by examiner

Ticket Title: Server is down. Server is stuck on "boot."

[Fetch Details]

You have been identified as a possible expert on the above problem. Are you currently available to offer assistance?

| Yes, I can help | Yes, in X minutes | Sorry, I am busy |

*FIG. 3A*

People who have solved similar tickets (Click on a name to start a chat):

| Name | Blue Pages Link | Email | Associated Ticket |
|---|---|---|---|
| Guo, Shang | BluePages | E-mail | 31088267 |
| Lenchner, John | BluePages | E-mail | 29553761 |
| Tang, Jung-Mu | BluePages | E-mail | 30138239 |
| Lai, Jennifer | BluePages | E-mail | 30425087 |

*FIG. 3B*

INCREASING KNOWLEDGE SHARING SUCCESS RATES USING REAL TIME MATCH MAKING

BACKGROUND

The present invention relates to systems, methods, and computer program products for sharing knowledge and experience through a computing system.

Various systems have emerged for motivating people to share knowledge in public forums or through websites. One inhibitor to successful knowledge sharing is the lack of knowledge about the participants on both sides of the interaction (knowledge-seeker/requester and knowledge-provider/expert). For example, in the context of a live chat, a requester may not want to initiate a chat request because he or she may not feel comfortable requesting help from strangers. Even if the person does initiate a chat, the chat may not be successful due to a lack of response from the expert. This lack of success can cause the requester to be even more hesitant to request help from an unknown expert in the future. The process can become a vicious cycle with less and less chance that a potential requester will actually initiate a productive chat.

SUMMARY

In an exemplary embodiment, a method of knowledge sharing using a computer system is provided. The method includes: receiving a question electronically submitted by a user; forwarding the question and at least one response option to at least one expert using a first computer interface; monitoring selected response options from the at least one expert; and selectively presenting the selected response options to the user using a second computer interface.

BRIEF DESCRIPTION OF THE SEVERAL VIEWS OF THE DRAWINGS

The drawings described herein are for illustration purposes only and are not intended to limit the scope of the present disclosure in any way. It should be understood that throughout the drawings, corresponding reference numerals indicate like or corresponding parts and features.

FIGS. 3A and 3B are illustrations of user interfaces of the knowledge sharing system in accordance with an exemplary embodiment.

DETAILED DESCRIPTION

Figure 1:
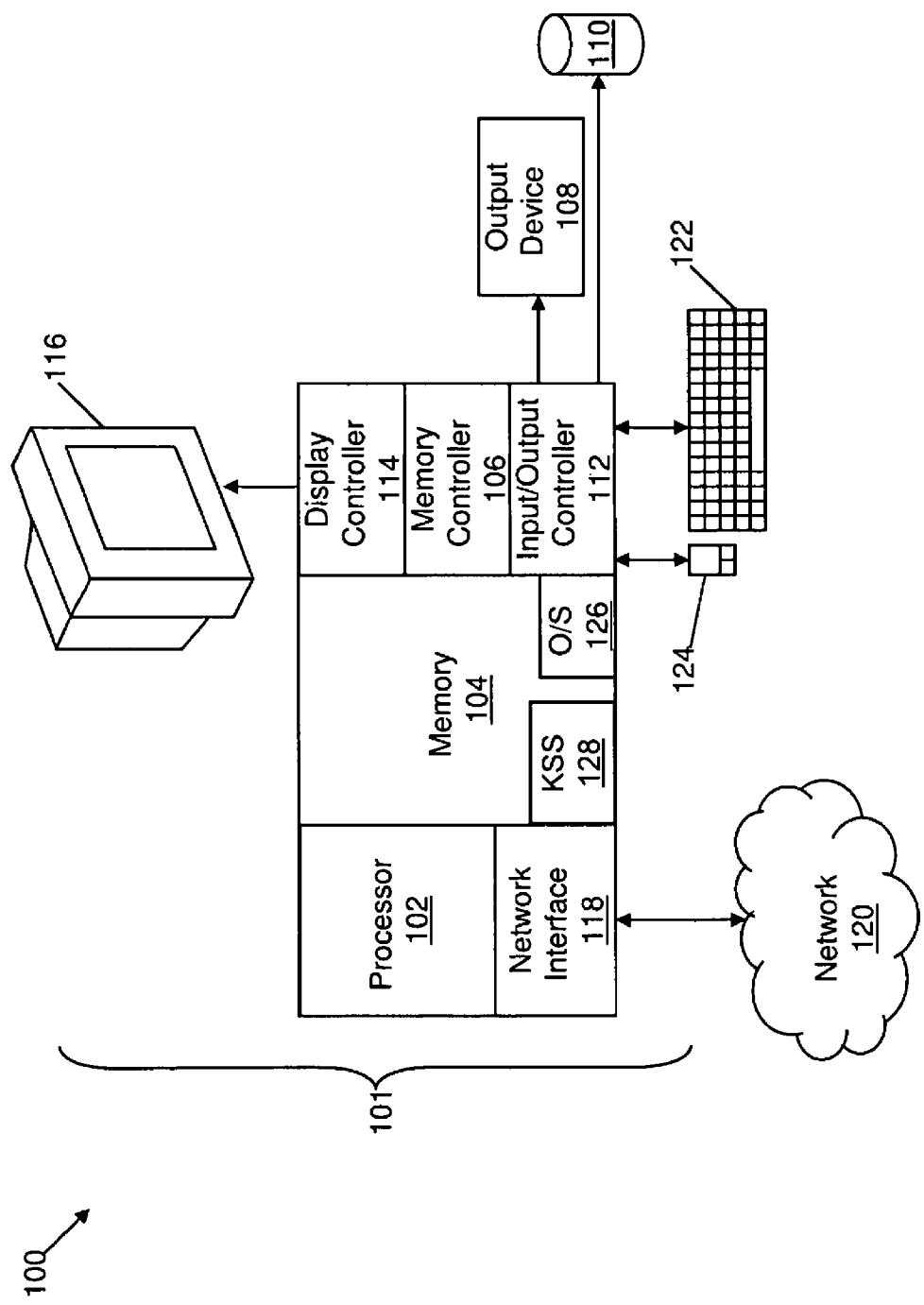
FIG. 1 is a block diagram illustrating a computing system that includes a knowledge sharing system in accordance with an exemplary embodiment.

Turning now to FIG. 1, the block diagram illustrates an exemplary computing system 100 that includes a knowledge sharing system (KSS) in accordance with the present disclosure. The computing system 100 is shown to include a computer 101. As can be appreciated, the computing system 100 can include any computing device, including, but not limited to, a desktop computer, a laptop, a server, a portable handheld device, or any other electronic device. For ease of the discussion, the disclosure will be discussed in the context of the computer 101.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, a conventional keyboard 122 and mouse 124 can be coupled to the input/output controller 112. In an exemplary embodiment, the computing system 100 can further include a network interface 118 for coupling to a network 120. The network 120 transmits and receives data between the computer 101 and external systems, such as other computing systems (not shown) that similarly include the knowledge sharing system of the present disclosure.

In various embodiments, the memory 104 stores instructions that can be executed by the processor 102. The instructions stored in memory 104 may include one or more separate programs, each of which comprises an ordered listing of executable instructions for implementing logical functions. In the example of FIG. 1, the instructions stored in the memory 104 include a suitable operating system (OS) 126. The operating system 126 essentially controls the execution of other computer programs and provides scheduling, input-output control, file and data management, memory management, and communication control and related services.

When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The processor 102 executes the instructions of the knowledge sharing system 128 of the present disclosure. In various embodiments, the knowledge sharing system 128 of the present disclosure is stored in the memory 104 (as shown), is executed from a portable storage device (e.g., CD-ROM, Diskette, FlashDrive, etc.) (not shown), and/or is run from a remote location, such as from a central server (not shown).

Generally speaking, the knowledge sharing system 128 accepts questions entered by a user via the keyboard 122 and/or mouse 124. The knowledge sharing system 128 includes a negotiation broker or match-making broker that handles an engagement process between a requester and an expert by selectively forwarding questions to one or more experts and managing responses entered by the experts. Based on the responses form the experts, the negotiation broker presents the responses to the requester so as to not discourage the requester. This added layer of a negotiation broker can ultimately increase the knowledge sharing success rate.

Figure 2:
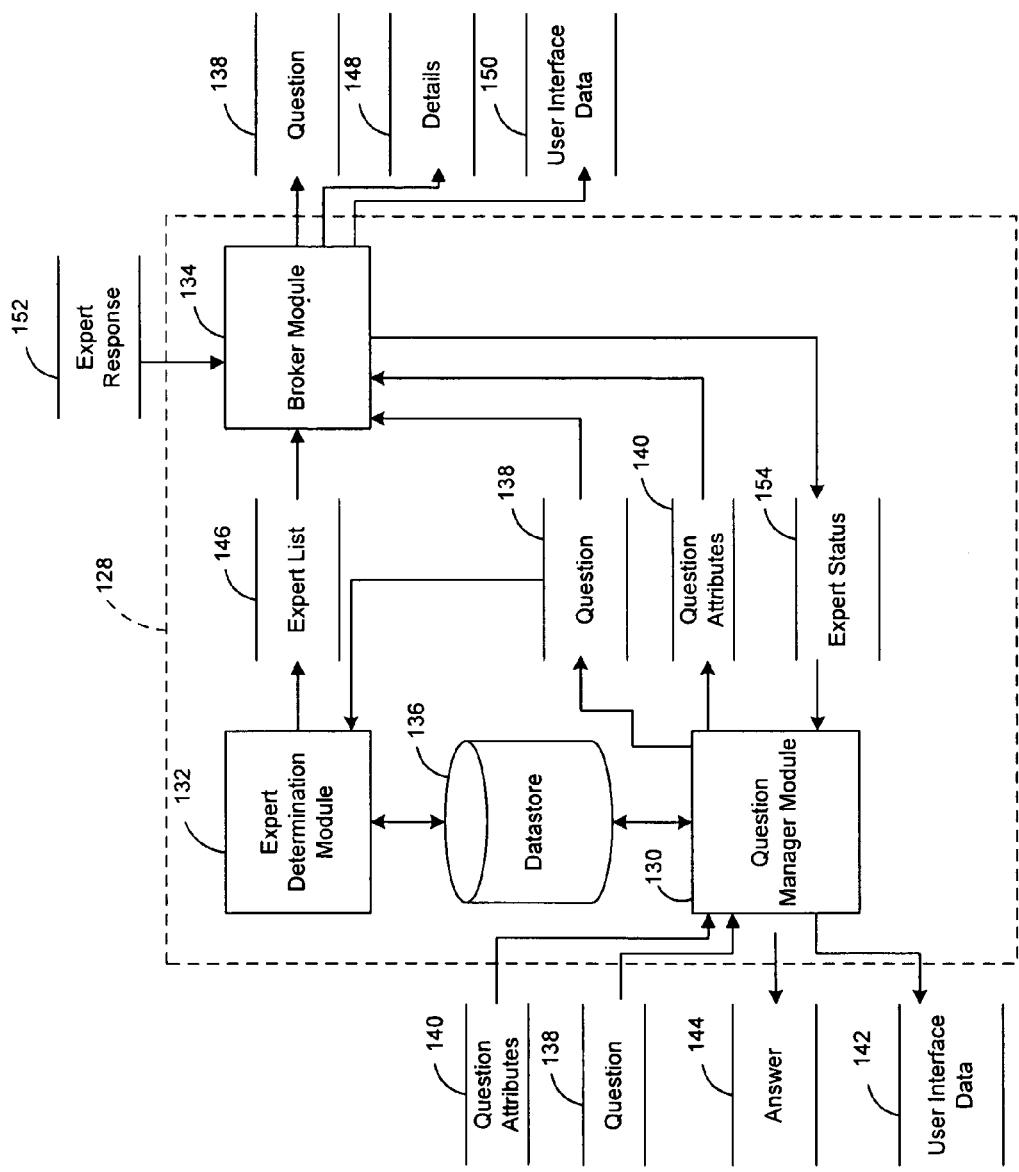
FIG. 2 is a dataflow diagram illustrating the knowledge sharing system of FIG. 1 in accordance with an exemplary embodiment.

Turning now to FIG. 2, the knowledge sharing system 128 is shown in more detail in accordance with an exemplary embodiment. The knowledge sharing system 128 includes one or more sub-modules and datastores. As can be appreciated, the sub-modules can be implemented as software, hardware, firmware, a combination thereof, and/or other suitable components that provide the described functionality. The sub-modules and datastore can reside on one or more computer systems. As can be appreciated, the sub-modules shown in FIG. 2 can be combined and/or further partitioned to similarly manage user questions and expert responses. In this example, the knowledge sharing system 128 includes a question manager module 130, an expert determination module 132, a broker module 134, and a datastore 136.

The datastore 136 stores information about submitted questions, submitted answers, and experts. The question information can include, but is not limited to, data indicating the text of the question, data indicating the subject, keyword, topic, or nature of the question, and data indicating a work-related department of the question. The answer information can include, but is not limited to, data indicating the text answer provided by the expert, data indicating the responses by the experts, and data indicating ratings of the answers. The expert information can include, but is not limited to, data indicating the expert, data indicating the expert contact information, data indicating the work category or department of the expert, data indicating topics of expertise, data indicating a question type, data indicating a question topic, and data indicating zero or more questions that were previously answered by the expert.

The question manager module 130 receives as input a question or problem (hereinafter referred to as a question 138) and question attributes 140. The question attributes 140 can be, for example, data indicating the nature or subject matter of the question, the priority or urgency of the question, and other user preferences. The question 138 and/or the question attributes 140 can be entered by a user, for example, via a user interface. The question manager module 130 manages the user interface via user interface data 142.

Once the question 138 is received, the question manager module 130 opens a ticket or record and associates the question attributes with the ticket or record. The question manager module 130 stores the ticket information in the datastore 136.

In various embodiments, the question manager module 130 reviews information stored in the datastore 136 to determine if the question 138 matches other previously submitted questions. If a sufficiently close match is found, the question manager module 130 responds to the current question 138 with a suggested answer or solution (herein referred to as an answer 144) provided by the datastore 136. If a match is not found, the question manager module 130 forwards the question 138 to the expert determination module 132.

The expert determination module 132 receives as input the question 138. The expert determination module 132 analyzes the question 138 and searches the data in the datastore 136 to select one or more experts that can potentially answer the question 138. In one example, the expert determination module 132 determines at least one of a type, a topic, or keywords of the question 138 and compares the type, topic, or keyword to other types, topics, or keywords of questions stored in the datastore 136. In this example, the expert determination module selects one or more experts that have answered one or more similar questions.

In another example, the expert determination module 132 selects the experts based on information stored in the datastore 136 such as, for example, expert self-enrollment data, administrative assignments of experts, promoted answers/solutions, prior dialog ratings of the experts, prior acceptance ratios of the experts, and a match with the expert's declared office hours. The one or more experts are provided as an expert list 146 to the broker module 134.

The broker module 134 receives as input the expert list 146, the question 138, and the question attributes 140. The broker module 134 interprets the question attributes 140 to provide question details 148 to the experts. For example, the broker module 134 can determine the nature of the question, the urgency of the question, and other preferences. The broker module 134 can select a subset of experts based on the question details 148.

The broker module 134 presents to each expert or the subset of the experts from the expert list 146 the question 138 and the details 148. The broker module 134 can present the information to the expert in the form of a user interface employing user interface data 150.

In one example, the user interface presents a real-time chat invitation including the question 138 to the one or more experts. As shown in FIG. 3A, the user interface 200 can include a text description 202 of the question 138, a details selection box 204, and one or more answer options 206-210.

The answer options 206-210, when selected, generate an expert response 152 to the broker module 134 (FIG. 2). The details selection box 204, when selected, displays a details interface (not shown) that displays the details 148 of the question 138. The expert can ask additional questions via the details interface. As shown in FIG. 3A the answer options 206-210 and the details selection box 148 are provided in the form of selection boxes. As can be appreciated, the answer options 206-210 and/or the selection box 148 can be provided as radio buttons, check boxes, drop-down menus, text boxes and/or any combination of the above listed or other forms of selection items.

With reference back to FIG. 2, the broker module 134 further receives as input the one or more expert responses 152. For example, an expert can accept or reject the real-time chat invitation based on his or her current condition or state of mind. An expert can also dynamically schedule his or her available time by proposing a deferred acceptance (i.e. will answer this question via real-time chat, but not right away) or even recommend other experts to answer this question. During the engagement process, the broker module 134 can also prompt the user for more information on behalf of an expert to clarify his or her needs. Likewise, the broker module 134 can provide the additional information to each expert in the identified list based on the expert's requests or needs.

After receiving and processing all the expert responses 152 within a predefined timeframe, the broker module 134 generates an expert status 154 including the expert's current state and ability/willingness to answer or engage in the question 138. In some cases, the current status can include new experts, based on recommendations received during the negotiation process.

The question manager module 130 receives as input the expert status 154. The question manager module 130 presents the expert status 154 to the user via the user interface data 142. The expert status 154 can be presented to the user in the form of text, visual icons, and/or other display means.

In one example, as shown in FIG. 3B, an expert list 220 is presented to the user based on the expert status 154. For an expert who is willing to accept an invitation immediately, the question manager module 130 presents an acceptance icon 230, for example a smiling face icon, next to the listed name of the expert to encourage a user to initiate a chat immediately. In another example, for an expert who is willing to accept an invitation, but not immediately, the question manager module 130 presents a delay icon 240, for example a clock icon, next to the expert's name listed in the user interface 219. For an expert who has not yet provided a response, the question manager module 130 presents a no response icon 242, for example an hourglass icon, next to the expert's name listed in the user interface 219. For an expert who has indicated that they do not want to provide a response, the question manager module 130 removes the name of the expert from the list 220 in the user interface 219.

Figure 4:
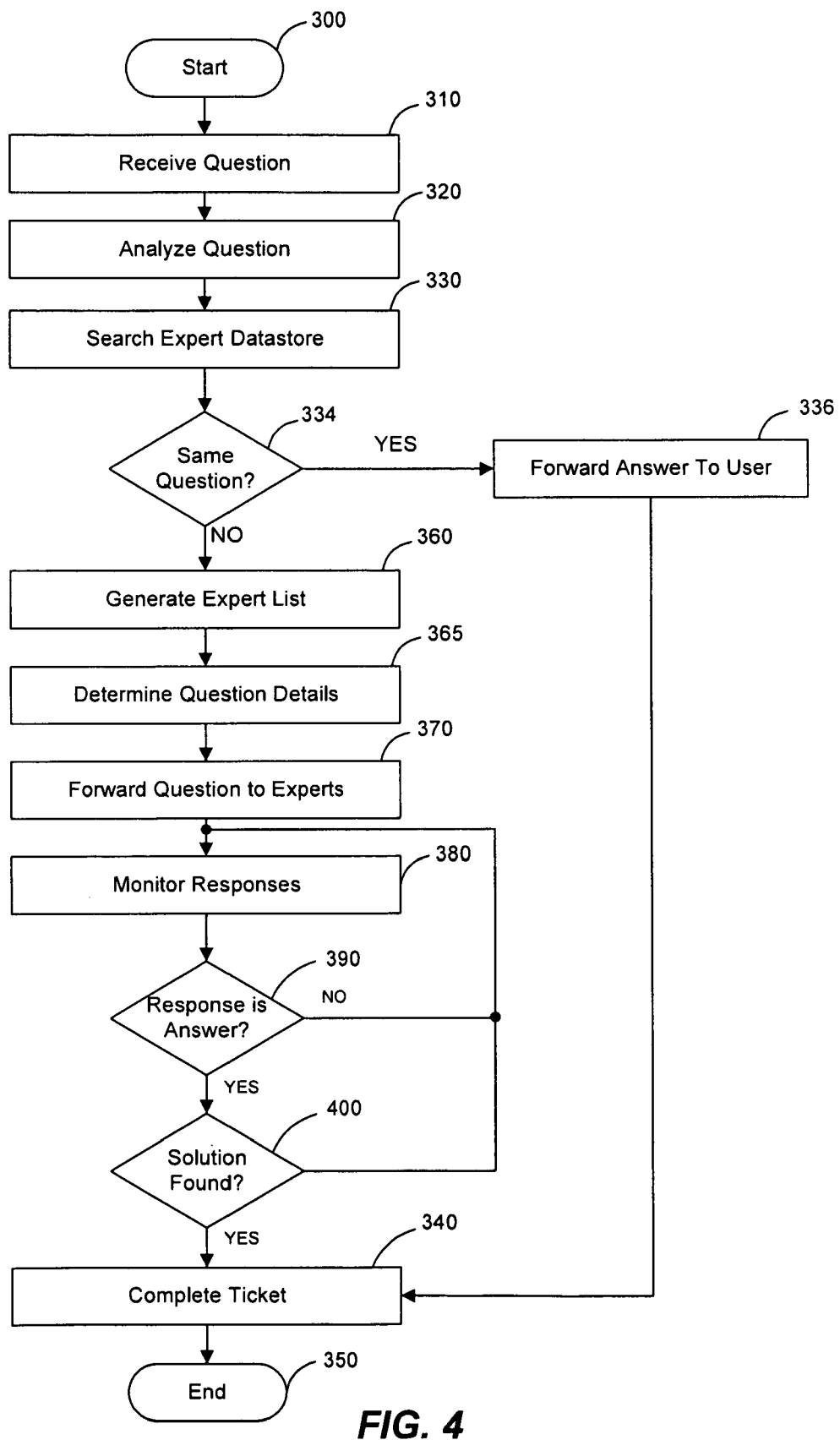
FIG. 4 is a flowchart illustrating a knowledge sharing method in accordance with an exemplary embodiment.
Figure 5:
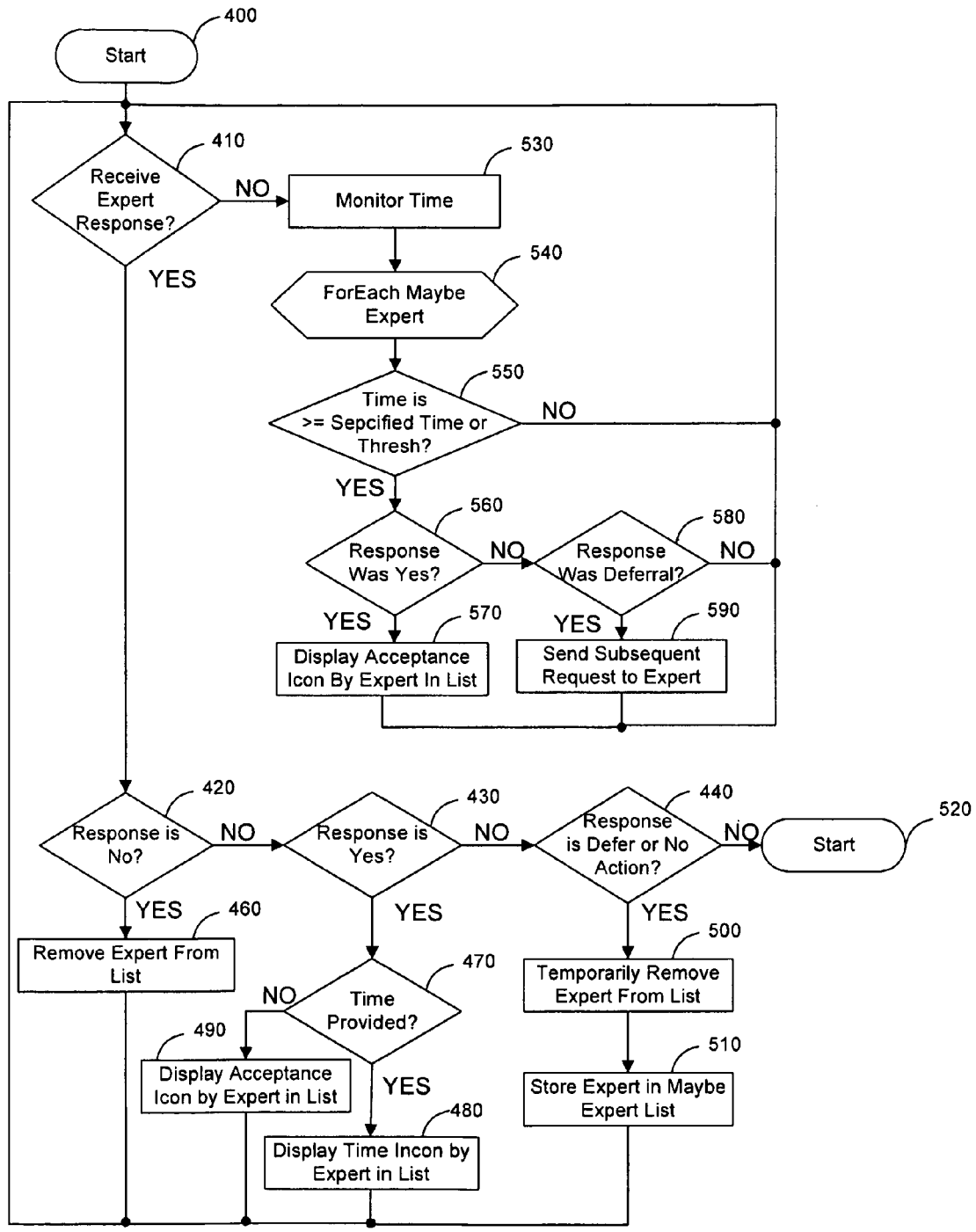
FIG. 5 is a flowchart illustrating a response monitoring method of the knowledge sharing method of FIG. 4 in accordance with an exemplary embodiment.

Turning now to FIGS. 4 and 5 and with continued reference to FIG. 2, flowcharts illustrate a knowledge sharing method that can be performed by the knowledge sharing system 128 of FIG. 2 in accordance with an exemplary embodiment. As can be appreciated in light of the disclosure, the order of operation within the method is not limited to the sequential execution as illustrated in FIGS. 4 and 5, but may be performed in one or more varying orders as applicable and in accordance with the present disclosure. As can be appreciated, one or more steps can be added or deleted from the method without altering the spirit of the method.

In one example, the method may begin at process block 300. The question 138 is received at process block 310. The question is analyzed at process block 320 and the datastore 136 is searched at process block 330. If a same or similar question is found at process block 344, the answer 144 is forwarded to the user at process block 360. Thereafter, the ticket is completed at process block 340, and the method may end at process block 350.

If, however, a same or similar question is not found in the datastore 136 at process block 334, the expert list 146 is determined at process blocks 360. Before forwarding the question 138 to the experts, the details are determined at process block 366. Thereafter, the details 148 and the question 138 are forwarded to the experts at process block 370.

The responses 152 from the experts are then monitored at process block 380 (as will be discussed in more detail with regard to FIG. 5). If the response 152 is an answer to the question 138 at process block 340, and the answer 144 is the correct solution to the question 138 at process block 400, the ticket is completed at process block 340. Thereafter, the method may end at process block 350.

If, however, the response is not an answer 144 at process block 400, or the response is an answer 144 at process block 390, but the answer 144 is not the solution to the question 138 at process block 400, then the method continues to monitor the responses at process block 380 until the solution is found.

Turning now to FIG. 5, a monitoring method of process block 380 of FIG. 4 is shown in more detail. In one example, the method may begin at process block 400. If an expert response 152 is received a process block 410, the response 152 is evaluated at process blocks 420-440. If, at process block 420, the expert response 152 is "no," the experts name is removed from the listing of experts in the interface 220 (FIG. 3B) at process block 460. If, at process block 430, the expert's response is "yes," it is determined whether a time is provided at process block 470. If a time is provided at process block 470, the delay icon 240 is displayed by the expert's name in the expert list 220 at process block 480. If, however, the time is not provided at process block 470, an acceptance icon 230, is displayed by the expert's name in the expert list 220 at process block 490. If, however, the response 152 is a deferral or no action at process block 440, the expert's name is temporarily removed from the expert list at process block 500, and the expert's name is stored in a maybe expert list at process block 510. If, however, the response is not "no" at process block 420, is not "yes" at process block 430, and is not a deferral or no action at process block 440, the method may end at process block 520.

If, however, at process block 410, an expert response 152 is not received, the time is monitored at process block 530. For each expert listed in the maybe expert list at process block 540, the current time is evaluated at process block 550 and an action is taken at process blocks 560-590. For example, if the current time is greater than or equal to a specified time or greater than or equal to a predefined threshold at process block 550, and the previous response was "yes," the acceptance icon 230 is displayed by the expert's name in the expert list 220 at process block 510. If, however, the previous response was not "yes" at process block 560, rather the previous response was "defer" or no action at process block 580, a subsequent request is sent to the expert at process block 590. Thereafter, the method continues by monitoring for expert responses at process block 410.

As can be appreciated, the flowcharts and block diagrams in the Figures illustrate the architecture, functionality, and operation of the possible implementations of systems, methods, and computer program products according to various embodiments of the present disclosure. In this regard, each block in the flowchart or block diagrams may represent a module, segment, or a portion of code which comprises one or more executable instructions for implementing the specified logical functions. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts can be implemented by special purpose hardware-based systems that perform the specified functions or acts, or combinations of special purpose hardware and computer instructions.

As one example, one or more aspects of the present disclosure can be included in an article of manufacture (e.g., one or more computer program products) having, for instance, computer usable media. The media has embodied therein, for instance, computer readable program code means for providing and facilitating the capabilities of the present disclosure. The article of manufacture can be included as a part of a computer system or provided separately.

Additionally, at least one program storage device readable by a machine, tangibly embodying at least one program of instructions executable by the machine to perform the capabilities of the present disclosure can be provided.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise process in a suitable manner, if necessary, and then stored in a computer memory. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While a preferred embodiment has been described, it will be understood that those skilled in the art, both now and in the future, may make various improvements and enhancements which fall within the scope of the claims which follow. These claims should be construed to maintain the proper protection for the disclosure first described.

The terminology used herein is for the purpose of describing particular embodiments only and is not intended to be limiting of the invention. As used herein, the singular forms "a", "an" and "the" are intended to include the plural forms as well, unless the context clearly indicates otherwise. The corresponding structures, features, materials, acts, and equivalents of all means or step plus function elements in the claims below are intended to include any structure, material, or act for performing the function in combination with other claimed elements as specifically claimed. The disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of knowledge sharing using a computer system, the method comprising:
   receiving a question electronically submitted by a user;
   selecting, in real time, at least one expert based on the question;
   forwarding the question and at least one response option to the at least one expert using a first computer interface;
   monitoring selected response options from the at least one expert;
   temporarily removing the at least on expert from a list of available experts responsive to receiving no action from the at least one expert or receiving a deferral from the at least one expert; and
   selectively presenting the selected response options to the user using a second computer interface, responsive to receiving at least one of the selected response options.

2. The method of claim 1 further comprising:
   receiving question attributes electronically submitted by a user;
   determining question details based on the question attributes; and
   forwarding the question details to the at least one expert using a third computer interface.

3. The method of claim 1 wherein the at least one response option includes at least one of an affirmative option, a negative option, and a deferral option.

4. The method of claim 1 wherein the at least one response option includes an available time option.

5. The method of claim 1 further comprising determining a graphical display that corresponds with the selected response option.

6. The method of claim 5 wherein the selectively presenting the selected response options comprises presenting the graphical display that corresponds with the selected response option to the user.

7. The method of claim 5 wherein determining the graphical display comprises determining an acceptance icon when the selected response option is an affirmative option.

8. The method of claim 5 wherein determining the graphics display comprises determining a deferral icon when the selected response option is a deferral option.

9. The method of claim 1 further comprising
   presenting a listing of the at least one expert to the user using a fourth computer interface.

10. The method of claim 8 further comprising when the selected response option is a negative option, removing the expert from the listing of the at least one expert.

11. A system embedded in a computer-usable storage medium for knowledge sharing when executed by one or more processors, the system comprising:
    a question manager module that receives a question submitted by a user;
    an expert determination module that determines, in real time, one or more experts based on the question; and
    a broker module that forwards the question and at least one response option to one or more experts, and that monitors selected response options from the at least one expert;
    wherein the broker module temporarily removes the one or more experts from a list of available experts responsive to receiving no action from the at least one expert or receiving a deferral from the at least one expert, and the question manager module selectively presents the selected response options to the user responsive to receiving at least one of the selected response options.

12. The system of claim 11 wherein the broker module receives question attributes submitted by a user, determines question details based on the question attributes, and forwards the question details to the at least one expert.

13. The system of claim 11 wherein the at least one response option includes at least one of an affirmative option, a negative option, and a deferral option.

14. The system of claim 11 wherein the at least one response option includes an available time option.

15. The system of claim 11 wherein the question manager module determines a graphical display that corresponds with a selected response option.

16. The system of claim 15 wherein the question manager module selectively presents the selected response option by presenting the graphical display.

17. The system of claim 15 wherein the question manager module determines an acceptance icon when the selected response option is an affirmative option.

18. The system of claim 15 wherein the question manager module determines a deferral icon when the selected response option is a deferral option.

19. The system of claim 11 wherein the wherein the question manager module presents a listing of the one or more experts to the user.

20. The system of claim 19 wherein the question manager module, when the selected response option is a negative option, removes the expert from the listing of the at least one expert.

* * * * *